United States Patent

[11] 3,598,353

| [72] | Inventor | Richard Paul De Grey<br>Pasadena, Calif. |
|---|---|---|
| [21] | Appl. No. | 19,744 |
| [22] | Filed | Mar. 16, 1970 |
| [45] | Patented | Aug. 10, 1971 |
| [73] | Assignee | Lockheed Aircraft Corporation<br>Burbank, Calif. |

[54] AIR-DAMPED SHOCK MOUNT
2 Claims, 2 Drawing Figs.

| [52] | U.S. Cl. | 248/358,<br>267/35, 267/122 |
|---|---|---|
| [51] | Int. Cl. | F16f 15/08 |
| [50] | Field of Search | 248/358, 9,<br>22, 15, 18; 267/35, 119, 121, 122, 123 |

[56] References Cited
UNITED STATES PATENTS

| 2,387,066 | 10/1945 | Harding | 248/358 |
|---|---|---|---|
| 1,994,885 | 3/1935 | DeFlorez | 248/358 |
| 2,610,016 | 9/1952 | Crede | 248/358 |
| 2,956,761 | 10/1960 | Weber | 248/22 |
| 3,231,255 | 1/1966 | Olson | 248/358 X |
| 3,249,330 | 5/1966 | Preis | 248/358 |
| 3,371,894 | 3/1968 | Hartnell-Beavis | 248/358 X |

*Primary Examiner*—Chancellor E. Harris
*Attorney*—George C. Sullivan

ABSTRACT: An air-damped shock mount wherein the object support pad rests on a rubber bumper at normal atmospheric pressure; e.g., sea level and is supported on a volume of air at low atmospheric pressure; e.g., high altitude.

PATENTED AUG 10 1971 3,598,353

INVENTOR.
RICHARD P. DEGREY

BY George C. Sullivan
Agent

AIR-DAMPED SHOCK MOUNT

This invention relates to a shock mounting and more particularly to an air-damped shock mounting for sensitive equipment.

Conventional shock mounts take many forms, such as rubber, springs, air cushions, synthetics, i.e., foams and the like, and various combinations of these. One such shock mount employs spring damping in conjunction with air damping; however, the damping varies with the altitude due to the variation of the air density passing through an orifice. Another existing mount utilizes an external air supply to maintain constant damping.

The shock mount of the present invention utilizes air damping in conjunction with synthetic rubber. In this mount, the air cavity is sealed at normal atmospheric pressure. At sea level the rubber is used as a damping medium, and at high altitude an air cushion is used. Since the unit is sealed, the air damping which takes place through an orifice remains constant.

An object of the invention is to provide a shock mount having air damping which remains constant.

A further object of the invention is to provide an air-damped shock mount which has a closed self-contained air supply.

A further object of the invention is to provide an air-damped shock mount which responds to differential pressure.

These and other objects will become more apparent from the following description when taken with the drawings in which.

Figure 1:
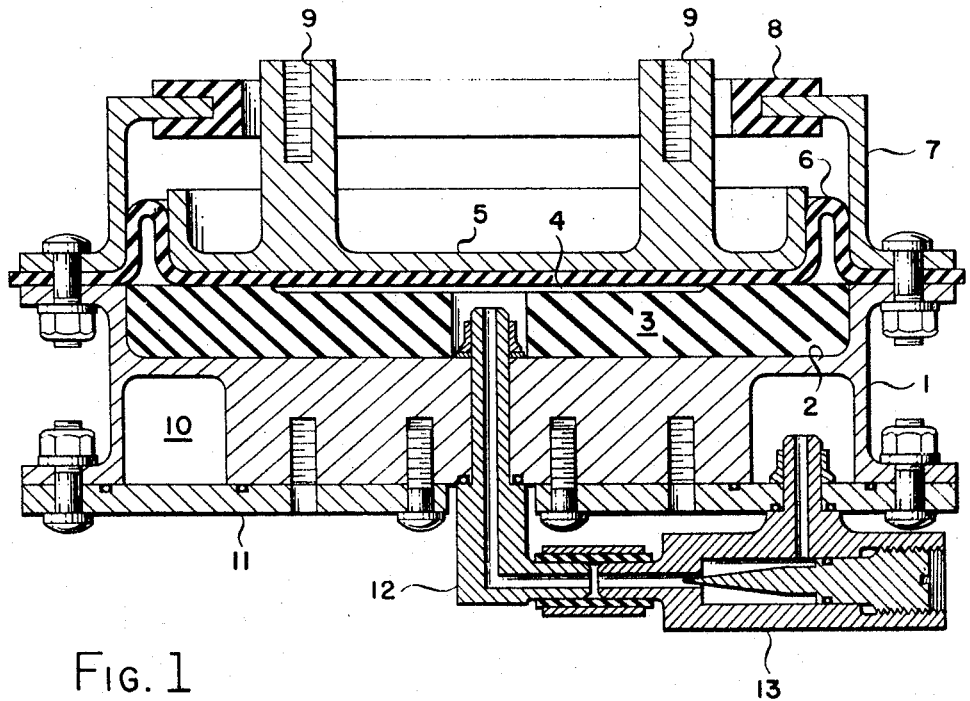
FIG. 1 is a cross-sectional view of an embodiment of the invention in elevation and showing the shock mount at normal atmospheric pressure (low altitude)

Turning now to FIG. 1, shock mount body 1 has a cup 2 machined into the upper surface. A bumper 3 of rubber or other resilient material is cemented to the cup. It will be noted that the bumper has a small cavity 4 in the upper surface, which is provided to assure an initial lifting area as herein described. An object support pad 5 is bonded to a fabric reinforced diaphragm 6 and the unit is seated on the rubber bumper. A cover 7 is fastened to the body as shown, thereby sealing the diaphragm to the body. A rubber guard 8 on the cover prevents excessive lateral movement of the support pad. Object-mounting holes 9 are provided in the pad posts. The bumper and guard should have a shore hardness of about 50.

A reservoir cavity 10 is formed in the bottom of body 1. Plate 11 covers the reservoir cavity, which is made airtight by means of seals in a conventional manner. A connector 12 is attached to the body 1, and an orifice 13 is attached to the plate 11, the combination connecting the cavity 4 with the reservoir cavity 10. The orifice is shown as being adjustable, but it is to be understood that a fixed orifice may be used.

Figure 2:
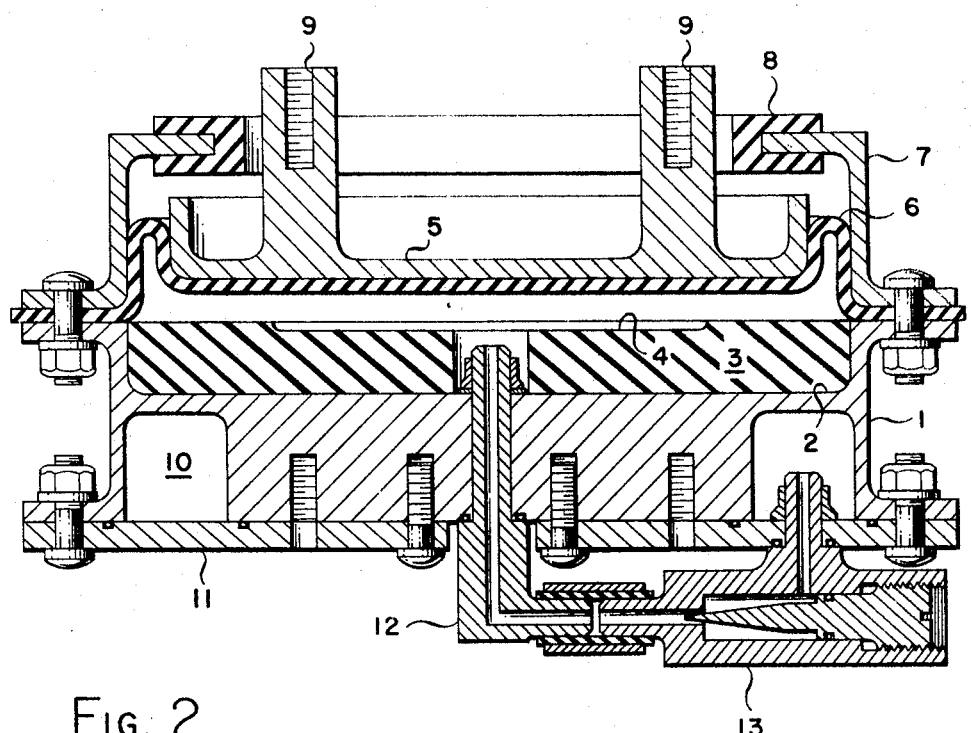
FIG. 2 is similar to FIG. 1, and showing the mount at low pressure (high altitude).

The shock mount is assembled and sealed at sea level where the differential pressure (inside of mount to ambient) is 0. As the mount is raised in altitude, the differential pressure (internal to ambient) is increased until the object support pad and diaphragm are raised from the rubber bumper pad creating an air cushion as in FIG. 2. The shocks or movements are damped out by porting the air between the diaphragm cavity 4 and the reservoir cavity 10 through the orifice. The damping remains constant above the altitude at which the differential pressure raises the object from the rubber-damped position to the air-damped position. The resonant frequency is lower on the airmass support and is why the air pressure support is superior to molded-rubber-type support. At the time of high energy inputs (such as landing or low altitude gusts), the system is on the rubber support phase and the resonance frequency is higher, thus providing the mechanical protection required to prevent damage to the supported body.

What I claim is:

1. A device for shock mounting an object comprising a shock mount body, a resilient bumper seated in said body, an object support pad, an air-impervious diaphragm attached to said support pad and sealingly attached to said body, said bumper having a small cavity therein, a reservoir cavity in said body, means including an orifice connecting the two cavities, whereby at sea level said support pad and diaphragm rest on said bumper, and at high altitudes on the resulting air cushion.

2. The shock mounting as defined by claim 1 and wherein the differential pressure between the small cavity and ambient is zero.